H. C. ODENRIDER.
FOUR WHEEL TRUCK WEEDER.
APPLICATION FILED OCT. 1, 1919.
1,348,311.
Patented Aug. 3, 1920.
3 SHEETS—SHEET 3.
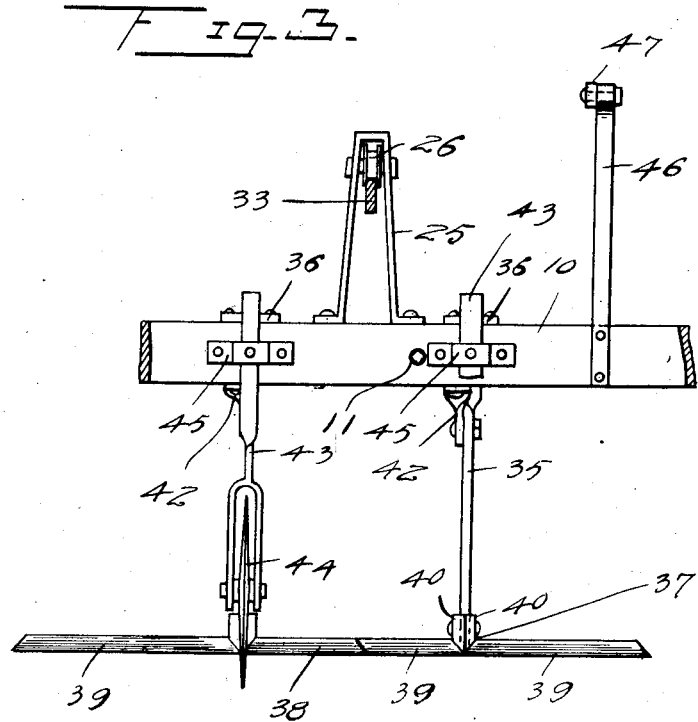
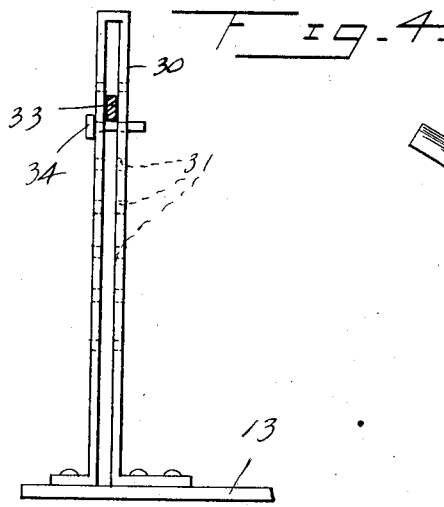
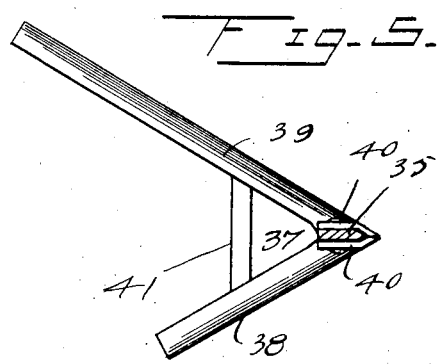
Inventor
H. C. Odenrider,
By Watson E. Coleman
Attorney

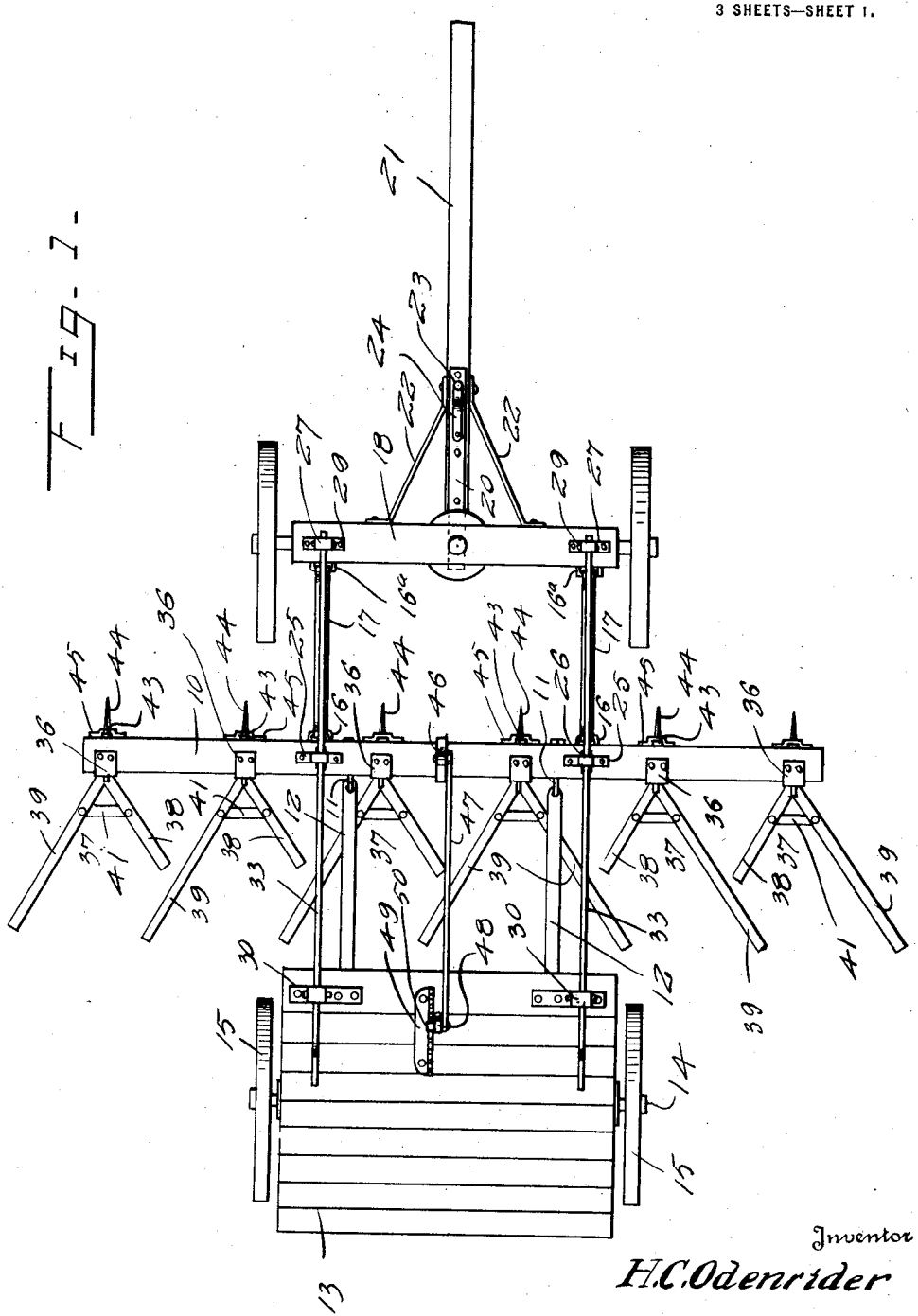

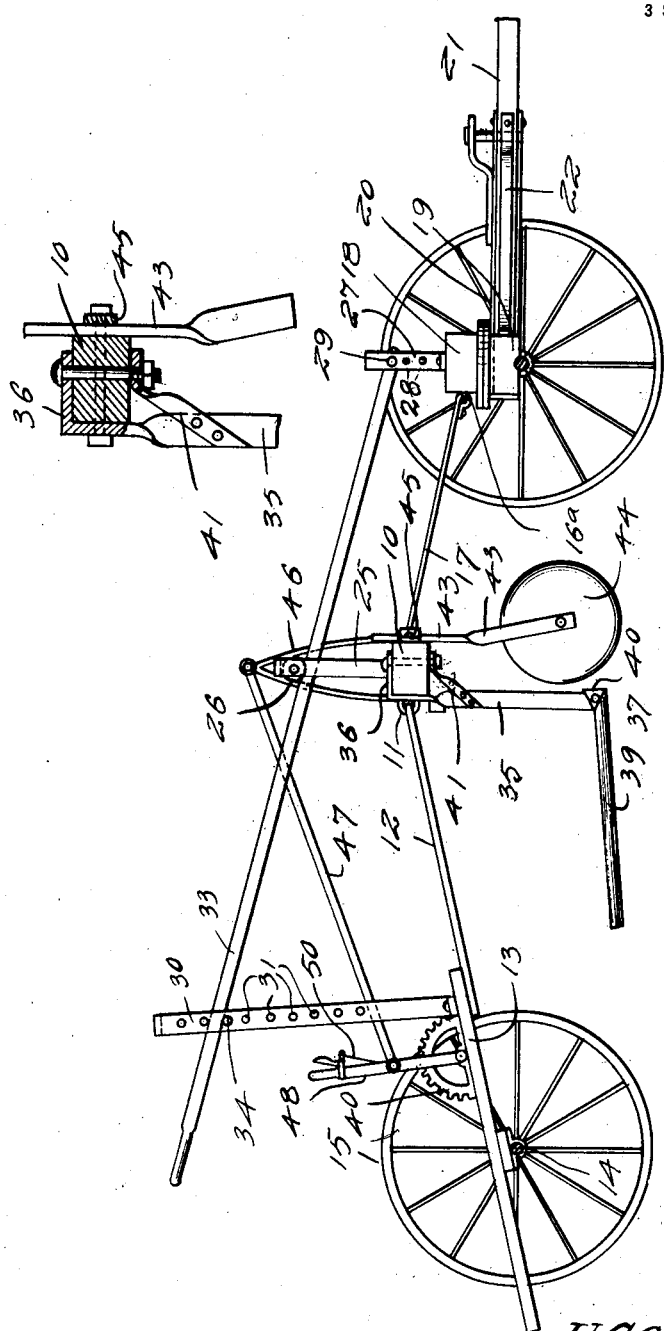

UNITED STATES PATENT OFFICE.

HENRY C. ODENRIDER, OF WILBUR, WASHINGTON.

FOUR-WHEEL-TRUCK WEEDER.

1,348,311.   Specification of Letters Patent.   Patented Aug. 3, 1920.

Application filed October 1, 1919. Serial No. 327,619.

*To all whom it may concern:*

Be it known that I, HENRY C. ODENRIDER, a citizen of the United States, residing at Wilbur, in the county of Lincoln and State of Washington, have invented certain new and useful Improvements in Four-Wheel-Truck Weeders, of which the following is a specification, reference being had to the accompanying drawings.

This invention relates to agricultural machines, and particularly to weeders.

The general object of this invention is to provide a horse-drawn weeding machine including a transverse, tiltable beam on which a plurality of weeding knives or cutters are mounted, a wheeled platform so connected to the beam that the beam is freely movable vertically with relation thereto and upon which platform the operator stands, and means for tilting the beam to thereby tilt and control the angle of incidence of the blades or cutters, and means for causing the upward or downward movement of the beam to thereby raise or depress the cutters.

A further object is to provide improved means to this end of a very simple construction, which is relatively light in draft and which is easily handled.

And a further object is to provide improved weed cutters, V-shaped in plan, there being a rotatable cutting disk carried upon the beam and disposed at the apex of each V-shaped cutter or cutting blade.

Other objects will appear in the course of the following description.

My invention is illustrated in the accompanying drawings, wherein:—

Figure 1 is a top plan view of a weeder constructed in accordance with my invention;

Fig. 2 is a side elevation thereof;

Fig. 3 is a fragmentary elevation of the beam 10 with the attached parts in elevation, the lever 33 being in section;

Fig. 4 is a front elevation of the supporting member 30;

Fig. 5 is a top plan view of one of the cutters;

Fig. 6 is a fragmentary sectional view through beam 10, the standard 35 being broken away.

Referring to these drawings, it will be seen that my weeder comprises a transverse beam 10 upon which the several cutters are mounted, as will be later explained, this beam on its rear side at spaced points having I-bolts 11. To these I-bolts are connected the rearwardly extending links 12 which thus are free to move vertically or swing laterally. These links 12 are attached in any suitable manner to a platform 13 which, as will be seen from Fig. 2, is downwardly and rearwardly inclined, this platform being mounted upon a rear axle 14 carrying supporting wheels 15.

Attached to the beam 10 are clips 16 to which the strap iron links 17 are pivotally connected, and these strap iron links in turn are connected to a bolster 18 by means of clips 16ª. It will be seen that the strap iron links are bent over to form eyes at their ends which engage with the cross bars of the clips 16ª. These clips 16ª and the clips 16 are bolted or otherwise attached to the ends of the beams 18 and 10. The bolster 18 is mounted upon a draft beam or axle 19 and the usual fifth wheel is disposed between the axle and the bolster. Attached to the draft beam 19 by the strap iron 20 is the tongue 21 which may be about 12' long and which is braced by the angular braces 22 so that the beam 19 and the tongue 21 move together. The usual clevis pin 23 is provided mounted on a leaf spring 24 for the engagement of suitable whiffle-trees or other draft attachments to the tongue. I do not wish to be limited to the particular construction of the tongue and of the beam 19, as it is obvious that these might be modified in many ways.

Attached to the upper face of the beam 10 at two points are the upwardly extending, inverted U-shaped irons 25 which are about 10" high, angularly bent at their lower ends in order to be bolted to the beam 10, and at their upper ends carrying the rollers 26 which are preferably grooved. Also attached to the transverse bolster 18 adjacent the opposite ends thereof are the approximately inverted U-shaped, upwardly extending irons 27 which are laterally bent at their lower ends to provide for attachment to the bolster 18, each iron 27 being formed with a plurality of perforations 28 in the legs of the iron for the passage of a pin 29. Mounted upon the platform 13 are upwardly extending, substantially inverted U-shaped irons 30 which are also perforated at a plurality of points, as at 31, and passing through the irons 25 and bearing against the rollers 26 are the lifting levers 33, each of which is pivoted upon a pin 29 and is held at its rear end in its adjusted position by means of a pin 34 inserted through the perforations 31 in the irons 30. By raising these levers, as for instance, to the full height of the irons 30, the levers will lift upon the yokes or irons 25, raising up on the beam 10 and thereby lifting the weeding or cutting devices up from the ground. When the pin 34 is removed, the weight of the beam 10 tends to force the parts downward and when the weeding or cutting devices have been lowered to a sufficient degree, the levers are again locked each in its adjusted position by the pin 34. I thus provide means for depressing the beam 10 or raising it equally at both ends or depressing one end of the beam and raising the other end of the beam.

Mounted at intervals upon the beam 10 are the blade carrying standards 35, each of which is made of a flat strip of metal, twisted at its upper end, and angularly bent, as at 36, to be disposed over the beam 10 and to the lower end of each standard 35 is attached a cutter 37 formed with blades 38 and 39. The corner of each blade is turned up, as at 40, and is riveted to the standard 35. It will be seen from Fig. 5 that each blade is sharpened at its forward edge. These blades 38 and 39 are connected by a cross brace 41 and each standard 35 is braced from the beam 10 by an upwardly and forwardly extending brace 42, bolted to the frame. Attached to the forward face of the beam 10 immediately opposite the apices of the several cutters 37 is a cutter disk support 43 which is made of flat iron, twisted so as to lie flat against the forward face of the beam 10 and be bolted thereto, the lower end of each strip being split and formed to fork and engage on each side of a disk cutter 44 and having trunnions engaging in the fork thus formed.

It will be seen that the cutters are held rigidly to the beam 16, and that if the beam 10 is raised, the cutters will be raised, but when the beam is lowered, the cutters will be lowered and that the standard 43 may be adjusted vertically with respect to the cutters 37, this being secured by the strap 45 which is bolted to the beam 10 and through which the standard 43 passes.

It is also possible to change the angle of the cutting blades with reference to the ground by rocking or tilting the beam 10, and to this end the beam 10 is formed at its middle with upwardly extending arms 46, each arm being preferably formed of strap iron formed to provide an eye at the upper end and two downwardly depending legs extending on each side of the beam and bolted thereto. This arm is connected by a link 47 to a lever 48 mounted on the platform 13, this lever moving over a rack 49 and engaging therewith by means of the usual spring actuated bolt 50 and actuating hand grip. Thus, by adjusting this lever 48, the beam may be tilted from its normal position where its upper face is horizontal, to a position with the upper face downwardly and forwardly inclined or downwardly and rearwardly inclined. Thus, the angle of inclination of the cutting blades 38 and 39 may be readily changed and adjusted. Preferably, these cutting blades 38 and 39 are not of equal length except for the middle pair of cutting blades. In these, both blades are of the same length, but on each side thereof the cutters are formed with the cutting blade 38 shorter than the blade 39, the blade 39 being disposed toward the adjacent side of the machine. Where the blades are of unequal length, the short blade 38 will preferably have a length of approximately 19", while the longer cutting blade will have a length of approximately 32".

It will be seen that by adjusting the fulcrum 29 of the lever 33 in the holes 28 that the forward end of the lever may be adjusted and then the lever may be raised or lowered to an extent permitted by the corresponding member 30 to any desired extent, thus securing a very large range of adjustments for the cutters. Inasmuch as the hangers or links 25 engage with the levers 33 by means of the rollers 36, it is obvious that the levers 33 will shift longitudinally as the beam 10 is lowered or raised, and it will also be obvious that the beam 10 may be tilted and the inclination of the cutters adjusted to any desired degree. The operator's weight is supported on the platform 13 and on the rear wheels and does not act to depress the weed cutters, thus permitting these weed cutters to be adjusted entirely by hand for the work desired to be done.

While I have described the beam 19 as being provided with a bolster 18 operatively connected thereto in the usual manner, I do not wish to be limited to this, as the bolster might be omitted if desired and the parts mounted upon the bolster be connected directly to the beam 19.

While I have illustrated a preferable form of my construction which I regard as very practical and which is thoroughly effective yet I do not wish to be limited thereto, as it is obvious that many changes might be made in the details of construction and arrangement of parts without departing from the spirit of the invention.

I claim:—

1. A weeding machine comprising a transverse beam, a front truck, links connecting the front truck to the beam, a rear truck, members attached to the rear truck and swingingly connected to the beam at the rear thereof, ground working implements attached to the beam and vertically movable therewith, and means pivotally mounted on one of said trucks and adjustably engaging the other truck for raising or lowering the beam.

2. A weeding machine comprising a transverse beam, a front truck, links connecting the front truck to the beam, a rear truck, members attached to the rear truck and swingingly connected to the beam at the rear thereof, ground working implements attached to the beam and vertically movable therewith, a lever pivotally supported upon the front truck, a hanger on the beam and through which said lever passes, and means carried by the rear truck for holding the lever in vertically adjusted positions.

3. A weeding machine comprising a transverse beam, a front truck, links connecting the front truck to the beam, a rear truck, members attached to the rear truck and swingingly connected to the beam at the rear thereof, ground working implements attached to the beam and vertically movable therewith, a pair of levers pivotally mounted upon the front truck and extending rearwardly over the rear truck, hangers mounted upon the beam and having rollers at their upper ends against which the levers bear, members extending upward from the rear truck with which the rear ends of the levers coact, and means on said members for holding the rear ends of the levers in adjusted positions.

4. A weeding machine comprising a transverse beam, a front truck, links connecting the front truck to the beam, a rear truck, members attached to the rear truck and swingingly connected to the beam at the rear thereof, ground working implements attached to the beam and vertically movable therewith, upwardly extending, perforated members mounted upon the front truck, levers having a pivot pin adjustable in any one of the perforations of said members, said levers extending rearward therefrom and over the rear truck, hangers attached to the upper face of the beam and carrying rollers at their upper ends beneath which the levers engage, members mounted upon the rear truck with which the levers coact, said members being each provided with a vertical series of perforations, and means engaging said perforations to engage the rear ends of the levers and hold them in their adjusted positions.

5. A machine of the character described comprising a transverse beam, ground working implements attached to said beam and movable therewith, a front truck including an axle and supporting wheels, links swingingly connecting the front truck with the beam and movable in a vertical plane, a rear axle having wheels, a platform carried by the rear axle, members extending from the truck and swingingly engaging the beam, upwardly extending members mounted upon the front axle, hangers mounted upon the beam and having rollers at their upper ends, levers having adjustable connection to said upwardly extending members at the forward ends of the levers and extending beneath said rollers to a point above the platform, upwardly extending members mounted upon the platform with which said levers coact, means on said members for engaging the rear ends of the levers and holding the levers in adjusted positions, and means for tilting the beam in a plane parallel to the longitudinal axis of the machine.

6. A machine of the character described comprising a transverse beam, ground working implements attached to said beam and movable therewith, a front truck including an axle and supporting wheels, links swingingly connecting the front truck with the beam and movable in a vertical plane, a rear axle having wheels, a platform carried by the rear axle, members extending from the truck and swingingly engaging the beam, upwardly extending members mounted upon the front axle, hangers mounted upon the beam and having rollers at their upper ends, levers having adjustable connection to said upwardly extending members at the forward ends of the levers and extending beneath said rollers to a point above the platform, upwardly extending members mounted upon the platform with which said levers coact, means on said members for engaging the rear ends of the levers and holding the levers in adjusted positions, and means for tilting the beam in a plane parallel to the longitudinal axis of the machine, and including an arm extending upward from the beam, a lever mounted upon the platform, a link extending from said arm to the lever, and means for holding the lever in adjusted positions.

In testimony whereof I hereunto affix my signature.

HENRY C. ODENRIDER.